US012656485B2

(12) United States Patent
Albou et al.

(10) Patent No.: US 12,656,485 B2
(45) Date of Patent: Jun. 16, 2026

---

(54) VEHICLE ASSEMBLY COMPRISING A RADAR SENSOR AND A LIGHT-EMITTING SIGNALLING MODULE

(71) Applicant: VALEO VISION, Bobigny (FR)

(72) Inventors: Pierre Albou, Bobigny (FR); Pierre Renaud, Bobigny (FR)

(73) Assignee: Valeo Vision, Bobigny (FR)

( * ) Notice: Subject to any disclaimer, the term of this patent is extended or adjusted under 35 U.S.C. 154(b) by 371 days.

(21) Appl. No.: 18/254,909

(22) PCT Filed: Nov. 17, 2021

(86) PCT No.: PCT/EP2021/082051
§ 371 (c)(1),
(2) Date: May 30, 2023

(87) PCT Pub. No.: WO2022/117351
PCT Pub. Date: Jun. 9, 2022

(65) Prior Publication Data
US 2024/0012137 A1 Jan. 11, 2024

(30) Foreign Application Priority Data
Dec. 1, 2020 (FR) ...................................... 2012495

(51) Int. Cl.
*G01S 13/931* (2020.01)
*G01S 7/02* (2006.01)
(Continued)

(52) U.S. Cl.
CPC ............ *G01S 13/931* (2013.01); *G01S 7/027* (2021.05); *H01Q 1/3233* (2013.01);
(Continued)

(58) Field of Classification Search
CPC ................... G01S 13/931; G01S 7/027; G01S 2013/93277; H01Q 1/3233; H01Q 1/3291; H01Q 19/06
See application file for complete search history.

(56) References Cited

U.S. PATENT DOCUMENTS 9,925,912 B2    3/2018   Zawacki et al.
10,322,566 B2   6/2019   Kamo
(Continued)

FOREIGN PATENT DOCUMENTS

CN    110094696 A    8/2019
CN    110907934 A    3/2020
(Continued)

OTHER PUBLICATIONS

European Patent Office, International Search Report (with English translation) and Written Opinion of corresponding International Application No. PCT/EP2021/082051, dated Mar. 2, 2022.
(Continued)

*Primary Examiner* — Sahlu Okebato
(74) *Attorney, Agent, or Firm* — Valeo Vision

(57) ABSTRACT

The invention relates to a vehicle assembly including a radar sensor configured to emit radar waves over a range of wavelengths, a luminous module. The luminous module including a sub-layer and a layer of patterns forming a sub-wavelength structured dielectric element with a repetition period of the patterns that is less than a quarter of a wavelength of the range, with the total thickness of the luminous module is equal to m times a wavelength of the range, the whole being divided by twice the equivalent refractive index of the sub-layer and of the layer of patterns, times the cosine of a refracted angle corresponding to an angle of incidence of the radar waves, where m is an integer.

13 Claims, 4 Drawing Sheets

(51) Int. Cl.
    *H01Q 1/32*         (2006.01)
    *H01Q 19/06*      (2006.01)

(52) U.S. Cl.
    CPC ........... *H01Q 1/3291* (2013.01); *H01Q 19/06*
        (2013.01); *G01S 2013/93277* (2020.01)

(56)            References Cited

U.S. PATENT DOCUMENTS

| | | | |
|---|---|---|---|
| 10,754,026 B2 | 8/2020 | Callewaert | |
| 11,079,092 B2 | 8/2021 | Le Corre et al. | |
| 11,199,610 B2 | 12/2021 | Takahashi et al. | |
| 11,460,536 B2 | 10/2022 | Miu et al. | |
| 11,845,376 B2 | 12/2023 | Junghahnel et al. | |
| 2007/0109206 A1* | 5/2007 | Fujii | H01Q 1/3233 |
| | | | 343/711 |
| 2017/0158111 A1* | 6/2017 | Zawacki | B60Q 1/2607 |
| 2018/0275269 A1* | 9/2018 | Lind | G01S 13/931 |
| 2018/0351274 A1* | 12/2018 | Callewaert | G01S 13/931 |

FOREIGN PATENT DOCUMENTS

| | | | |
|---|---|---|---|
| CN | 113574414 A | 10/2021 |
| DE | 102011115829 A1 | 4/2013 |
| DE | 102011115952 A1 | 4/2013 |
| EP | 3644087 A1 | 4/2020 |
| JP | 2005009922 A | 1/2005 |
| JP | 2020053918 A | 4/2020 |
| WO | 2020184103 A1 | 9/2020 |

OTHER PUBLICATIONS

China Patent Office, Office Action (with English translation) and Search Report of corresponding Chinese Application No. 202180080453.8, dated May 22, 2025, 11 pages.

Japan Patent Office, Decision to Grant (with English translation) of corresponding Japanese Patent Application No. 2023-533384 dated Feb. 27, 2024, 5 pages.

\* cited by examiner

Fig. 4

VEHICLE ASSEMBLY COMPRISING A RADAR SENSOR AND A LIGHT-EMITTING SIGNALLING MODULE

TECHNICAL FIELD

The present invention relates to a vehicle assembly for a vehicle. It has a particular but non-limiting application in motor vehicles.

BACKGROUND OF THE INVENTION

Increasing numbers of radar sensors are used to detect an object in the external environment of a motor vehicle and to estimate its angular position, and to accordingly execute automatic emergency braking, speed regulation or even blind spot detection functions. Conventionally, these radar sensors are mounted behind the bumper of the motor vehicle.

One disadvantage of this prior art is that integration behind the bumper reduces the performance capabilities of the radar sensors due to the layer of metallized paint applied to the bumper and due to the curved shape of said bumper. This leads to poor estimation of the angular position of an object.

SUMMARY OF THE INVENTION

Within this context, the aim of the present invention is to propose a vehicle assembly that allows the aforementioned disadvantage to be addressed.

To this end, the invention proposes a vehicle assembly for a vehicle, said vehicle assembly comprising:

—a radar sensor configured to emit radar waves over a range of wavelengths; and—a luminous module configured to perform a signaling function; —characterized in that said luminous module comprises a sub-layer and a layer of patterns, with said layer of patterns forming a sub-wavelength structured dielectric element with a repetition period of the patterns that is less than a quarter of a wavelength of said range, and characterized in that the total thickness of said luminous module is equal to m times a wavelength of said range, with the whole being divided by twice the equivalent refractive index of said sub-layer and of said layer of patterns, times the cosine of a refracted angle corresponding to an angle of incidence of the radar waves, where m is an integer.

According to non-limiting embodiments, the vehicle assembly can further comprise, alone or in any technically possible combination, one or more additional features selected from among the following.

According to one non-limiting embodiment, said radar sensor is a millimeter wave or a hyperfrequency wave or a microwave radar sensor.

According to one non-limiting embodiment, said radar waves are emitted over a frequency band ranging between 100 MHz and 5 GHz.

According to one non-limiting embodiment, said repetition period of the patterns is less than one tenth of said wavelength of the radar waves.

According to one non-limiting embodiment, said patterns are cylindrical prisms, or rectangular prisms, or pyramidal prisms, or cubic prisms, or segments of tori.

According to one non-limiting embodiment, a pattern has dimensions of less than 0.4 mm.

According to one non-limiting embodiment, said total thickness is formed by the height of said patterns and by the thickness of said sub-layer.

According to one non-limiting embodiment, if the angle of incidence is equal to zero, then the total thickness is equal to said wavelength divided by twice the equivalent refractive index.

According to one non-limiting embodiment, the total thickness is defined with an angle of incidence equal to $\arctan(d1/(2e4))$, with e4 being the distance between said radar sensor and said luminous module and d1 being the distance between an emitter antenna and receiver antennas of said radar sensor.

According to one non-limiting embodiment, said luminous module further comprises a reflective layer and the total thickness of said luminous module is equal to m times a wavelength of said range, with the whole being divided by twice the equivalent refractive index of said sub-layer, of said layer of patterns and of said reflective layer, times the cosine of a refracted angle corresponding to an angle of incidence of the radar waves, where m is an integer.

According to one non-limiting embodiment, the equivalent refractive index is computed for an angle of incidence of the radar waves equal to the center of a field of view of said radar sensor.

According to one non-limiting embodiment, said luminous module is a daylight luminous module, or an indicator light, or a retro reflector, or a high mounted stop lamp.

A luminous module is also proposed that is disposed facing a radar sensor configured to emit radar waves over a range of wavelengths, with said luminous module being configured to perform a signaling function and comprising a sub-layer and a layer of patterns, characterized in that said layer of patterns forms a sub-wavelength structured dielectric element with a repetition period of the patterns that is less than a quarter of a wavelength of said range, and characterized in that the total thickness of said luminous module is equal to m times said wavelength, with the whole being divided by twice the equivalent refractive index of said sub-layer and of said layer of patterns, times the cosine of a refracted angle corresponding to an angle of incidence of the radar waves, where m is an integer.

BRIEF DESCRIPTION OF DRAWINGS

The invention and its various applications will be better understood upon reading the following description and with reference to its accompanying figures, in which:

FIG. 4 is a perspective view of a local zone of the patterns of the layer of patterns of the luminous module of FIG. 3, according to one non-limiting embodiment.

DETAILED DESCRIPTION OF THE INVENTION

The identical elements, by structure or by function, that appear in the various figures use the same reference signs, unless otherwise specified.

The vehicle assembly 1 of a vehicle 2 according to the invention is described with reference to FIGS. 1 to 5. The vehicle assembly 1 is also called a vehicle system 1. In one non-limiting embodiment, the vehicle 2 is a motor vehicle. A motor vehicle is understood to mean any type of motorized vehicle. This embodiment is taken as a non-limiting example throughout the remainder of the description. Throughout the remainder of the description, the vehicle 2 is thus also called a motor vehicle 2. In another non-limiting embodiment, the vehicle assembly 1 is disposed in a lighting device or a signaling device of the motor vehicle 2, in the front or in the rear.

Figure 1:
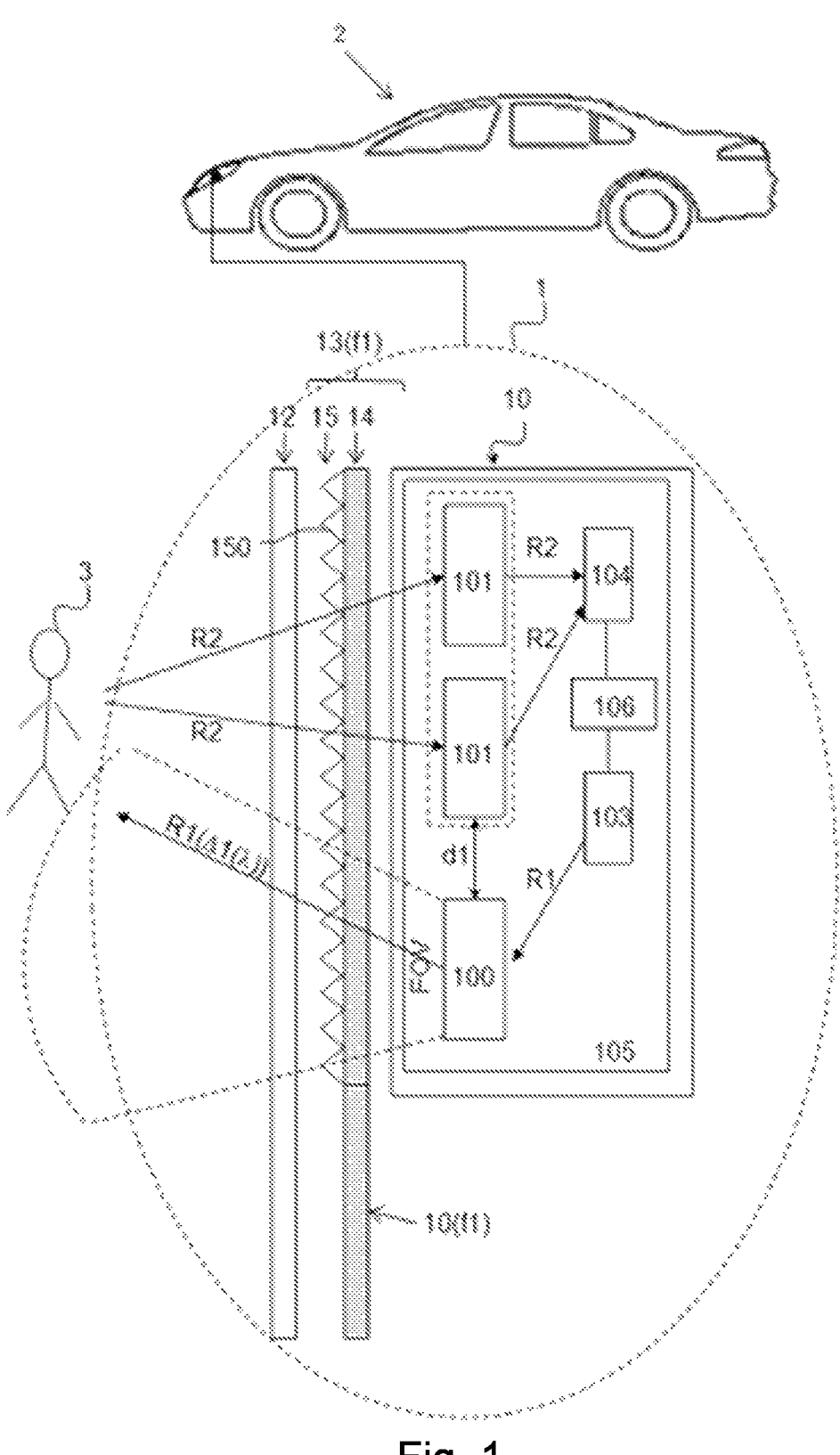
FIG. 1 is a schematic view of a vehicle assembly, said vehicle assembly comprising a radar sensor and a luminous module, according to one non-limiting embodiment of the invention.

As illustrated in FIG. 1, the light device for a vehicle 2 comprises:

—a radar sensor 10 having a field of view FOV and being configured to emit radar waves R1 in said field of view FOV, over a range Δ1 of wavelengths λ; —a luminous module 13 configured to perform a signaling function f1, also called a function f1. It is thus also called signaling luminous module 13.

The vehicle assembly 1 further comprises an output outer lens 12. The output outer lens 12 may or may not form part of the luminous module 13.

The radar sensor 10 is described hereafter. As illustrated in FIG. 1, the radar sensor 10 is disposed facing the luminous module 13. In one non-limiting embodiment, the radar sensor 10 is a millimeter wave (between 24 GHz and 300 GHz) or a hyperfrequency wave (between 300 MHz and 81 GHz) or a microwave (between 1 GHz and 300 GHz) radar sensor. In one non-limiting alternative embodiment, the radar sensor 10 operates at a radar frequency ranging between 76 GHz and 81 GHz. In one non-limiting embodiment, the radar waves R1 are emitted over a frequency band ranging between 100 MHz and 5 GHz. Thus, in one non-limiting example, if the sensor operates at a radar frequency of 77 GHz, that is a wavelength λ of 3.95 mm, with a frequency band of 1 GHz, the radar sensor 10 will operate over a frequency band of 76.5 GHz to 775 GHz. The radar waves R1 will thus be emitted over the frequency range 76.5 GHz to 77.5 GHz, that is a range Δ1 of wavelengths λ of 3.87 mm to 392 mm. Thus, in another non-limiting example, if the radar sensor 10 operates at a radar frequency of 78.5 GHz with a frequency band of 5 GHz, the radar sensor 10 will operate over a frequency band of 76 GHz to 81 GHz. The radar waves R1 will thus be emitted over the frequency range 76 GHZ to 81 GHz, that is a range Δ1 of wavelengths λ of 3.701 mm to 3.945 mm.

Figures 2, 3:
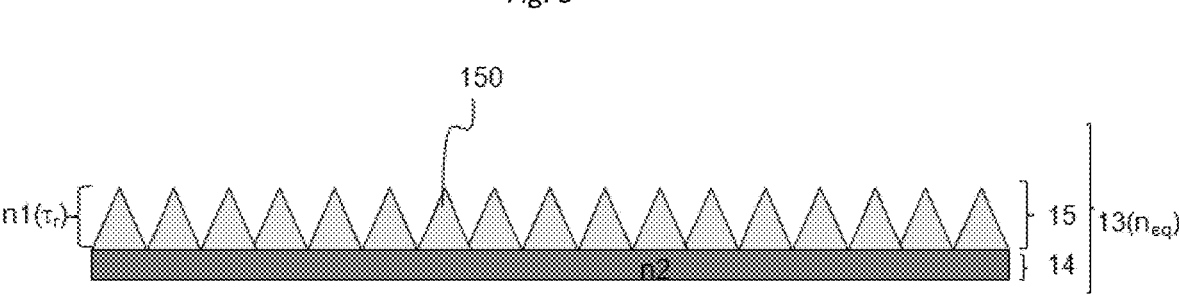
FIG. 2 is a schematic view of a radar wave emitted by the radar sensor of FIG. 1 that is partially reflected on said luminous module of FIG. 1, according to one non-limiting embodiment.
FIG. 3 is a schematic view of the luminous module of FIG. 1, with said luminous module comprising a sub-layer and a layer of patterns, according to one non-limiting embodiment.

As illustrated in FIG. 2, the emitted radar waves R1 arrive with an angle of incidence θ on the luminous module 13. In one non-limiting embodiment, the angle of incidence θ ranges between 0° and +/−30°. The field of view FOV thus varies between −30° and +30°. The center of the field of view FOV is an angle of 0° relative to the longitudinal axis of the vehicle, also called the axis of the vehicle. In another non-limiting embodiment, the field of view FOV thus varies between −90° and +45°. The center of the field of view FOV is at an angle of −45° relative to the axis of the vehicle and the angle of incidence θ of the radar waves R1 on the luminous module 13 remains close to 0° (with the vehicle assembly 1 then being positioned at approximately 45° to the axis of the vehicle).

The radar sensor 10 is configured to scan the external environment of the motor vehicle 2, by virtue of the emission of radar waves R1. As illustrated in FIG. 1, the radar sensor 10 thus comprises: —at least one emitter antenna 100 configured to emit radar waves R1, also called primary radar waves R1; —at least two receiver antennas 101 configured to receive radar waves R2, also called secondary radar waves R2 or return radar waves R2.

The radar sensor 10 further comprises at least one emitter 103 configured to generate the primary radar waves R1 and at least one receiver 104 configured to process the secondary radar waves R2 received in return. In one non-limiting embodiment, a single electronic component can be used for the two emission and reception functions. There will thus be one or more transceivers. Said emitter 103 generates primary radar waves R1 that are subsequently emitted by the emitter antenna 100, which waves, when they encounter an object 3 (in this case a pedestrian in the illustrated non-limiting example) in the external environment of the motor vehicle 2, reflect on said object 3. The radar waves thus reflected are waves that are emitted back to the radar sensor 10. These are the secondary radar waves R2 received by the receiver antennas 101. These are radar waves retransmitted toward the radar sensor 10. In one non-limiting embodiment, the primary radar waves R1 and the secondary radar waves R2 are radio-frequency waves. In one non-limiting embodiment, the radar sensor 10 comprises a plurality of emitters 103 and a plurality of receivers 104.

The emitter antenna 100, also called antenna 100, is configured to emit the primary radar waves R1 generated by the emitter 103. The receiver antennas 101, also called antennas 101, are configured to receive the secondary radar waves R2 and send them to the receiver 104, which subsequently processes them. A phase shift exists between the secondary radar waves R2 received by the receiver antennas 101 that allows the angular position of the object 3 relative to the motor vehicle 2 to be deduced therefrom, which object 3 is located in the external environment of the motor vehicle 2. In non-limiting embodiments, the antennas 100, 101 are patch antennas or slot antennas.

In one non-limiting embodiment, the antennas 100, 101, the emitter 103 and the receiver 104 are disposed on a printed circuit board 105. In one non-limiting embodiment, the printed circuit board is a rigid printed circuit board, also called PCBA (Printed Circuit Board Assembly) or a flexible printed circuit board, also called "Flexboard".

The radar sensor 10 further comprises an electronic control unit 106 configured to control the emitter 103 and the receiver 104. Since a radar sensor is known to a person skilled in the art, it is not described in more detail herein.

The luminous module 13 is described hereafter. The luminous module 13 is configured to perform a signaling function f1. In non-limiting embodiments, said luminous module 13 is a daylight luminous module, or an indicator light, or a retro reflector, or a high mounted stop lamp.

The luminous module 13 has an equivalent refractive index $n_{eq}$ to the scale of the wavelengths λ of the range Δ1 of wavelengths. It should be noted that n1 can be variable due to the optical design of the signaling function f1 (therefore of the layer 15 described hereafter, also called optical layer 15), which means that the equivalent refractive index $n_{eq}$ is variable. This must be taken into account in the computation of the thickness e0 described hereafter.

As illustrated in FIGS. 2 and 3, the luminous module 13 comprises a sub-layer 14 and a layer 15 of patterns 150. The sub-layer 14 is configured to support the layer 15 of patterns 150. It is disposed directly facing the radar sensor 10. It has a refractive index n2. In non-limiting embodiments, the sub-layer 14 is made of a plastic, glass or ceramic material. In one non-limiting example, the plastic is polycarbonate. The layer 15 of patterns 150 forms a sub-wavelength structured dielectric element. It has a refractive index n1, which is also called the local refractive index n1, that is dependent on the patterns 150 and on their spacing. The patterns 150 are defined during the optical design for performing the signaling function f1. In non-limiting embodiments, the patterns 150 are used to decouple light in a visible light guide, or are used to shape the light beam emitted by the luminous module 13. The patterns 150 are defined so as to comply with the regulations for the light beam of the luminous module 13 and its visible appearance in terms of aesthetics when the function f1 is turned on. The optical design is thus imposed without taking into account the presence or absence of the radar sensor 10, in particular so as not to create several versions of the optical layer 15.

In non-limiting embodiments, the dielectric element is made of a plastic, glass or ceramic material. In one non-limiting example, the plastic is polycarbonate. By way of a reminder, a dielectric material is non-conductive and therefore allows through the radar waves R1, unlike a conductive material. When the radar waves R1 are emitted by the radar sensor 10, they thus firstly encounter the sub-layer 14, then the layer 15 of patterns 150 and finally the output outer lens 12.

'Structured' is understood to mean that the layer 15 comprises patterns 150, also called structures. 'Sub-wavelength' is understood to mean that the structured dielectric material is on a scale smaller than the wavelengths $\lambda$ of said range $\Delta1$. The fact that the patterns 150 of the layer 15 are sub-wavelength allows this layer 15 to be modeled as a variable-index layer. Otherwise, the layer 15 would have to be considered to be a diffractive optical element.

Figure 4:
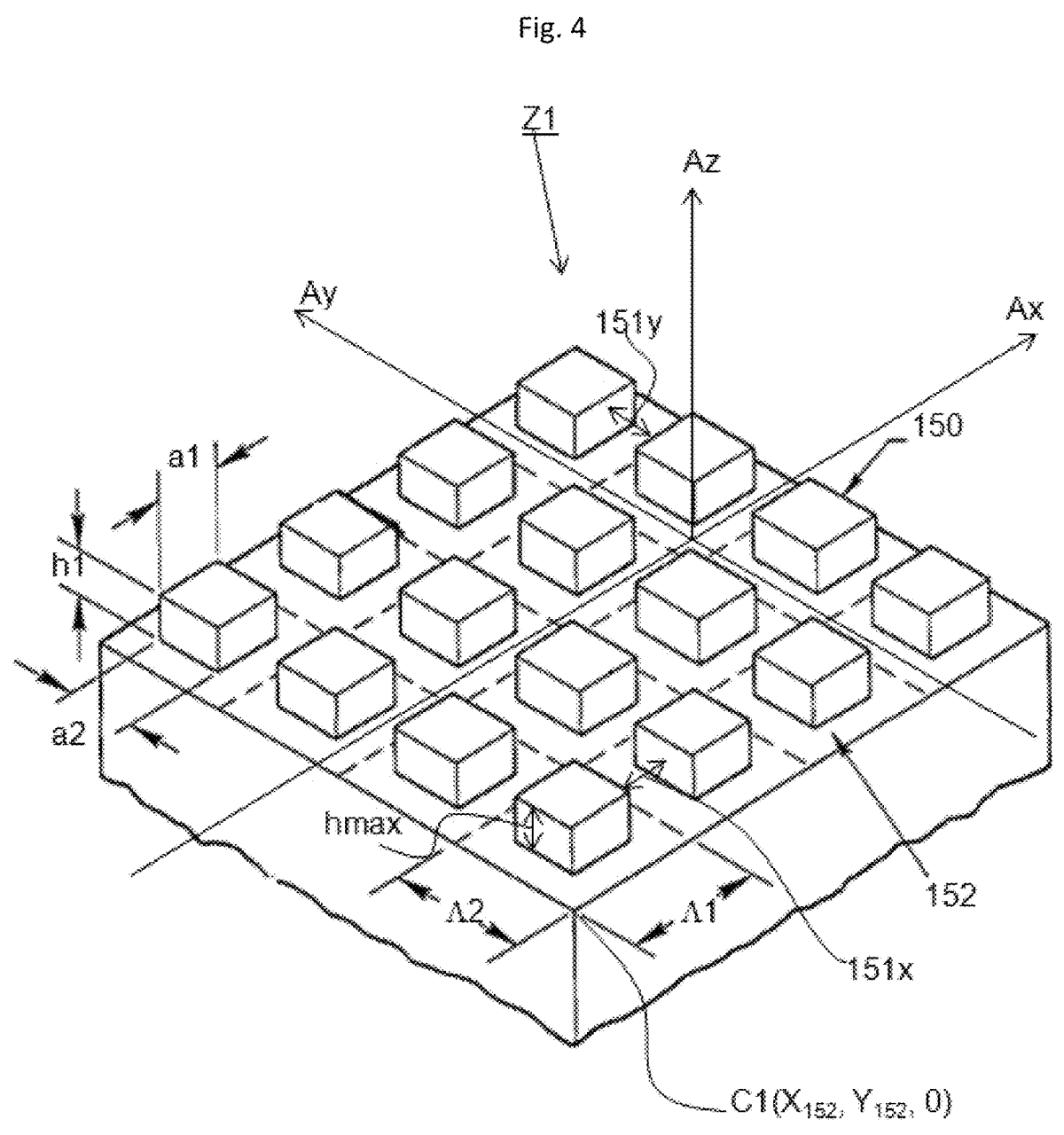

As illustrated in FIG. 4, which is a view of a local zone Z1 of the patterns 150 of the layer the patterns 150 have dimensions a1 (width), a2 (width), h1 (height). In non-limiting embodiments, the patterns 150 are cylindrical prisms (also called cylindrical pillars), or rectangular prisms (also called rectangular pillars), or pyramidal prisms (also called pyramid pillars), or cubic prisms (also called square pillars), with this latter case being illustrated in FIG. 4, or even segments of tori. They can also assume any other parallelepiped shape. In one non-limiting embodiment, a pattern 150 has dimensions a1, a2 of less than 0.4 mm. This value is very small compared to the wavelengths $\lambda$ of said range $\Delta1$. For example, the wavelength $\lambda$ is 4 mm for a frequency of 77 GHz; in this case, the value of a1, a2 is approximately equal to $\lambda/10$.

As illustrated in FIGS. 3 and 4, the layer 15 of patterns 150 is made up of individual cells 152 each comprising a pattern 150 and an air-filled segment surrounding said pattern 150. In one non-limiting alternative embodiment illustrated in FIG. 3, the patterns 150 are contiguous (they adjoin) on the boundary surface between the layer 15 and the sub-layer 14. This non-limiting alternative embodiment is applicable for patterns 150 in the shape of a pyramid or a segment of tori. An individual cell 152 is defined by the repetition period $\Lambda$ of the structures 150, also called the repetition period $\Lambda$ of the patterns 150 or even the grating period $\Lambda$, with $\Lambda=\Lambda1\times\Lambda2$. $\Lambda1$ is the grating period in a first direction Ax (illustrated in FIG. 4), and $\Lambda2$ is the grating period in a second direction Ay (illustrated in FIG. 4). Ax and Ay are arbitrary directions that are not parallel to each other. In one non-limiting embodiment, the second direction Ay is perpendicular to the first direction Ax. In another non-limiting example, the individual cell 152 is a square, a hexagon, a parallelogram, or any other shape that allows the boundary surface between the layer 15 and the sub-layer 14 to be tiled periodically. A third direction perpendicular to the first direction Ax and to the second direction Ay will be denoted Az, with these directions together forming an Ax, Ay, Az reference frame.

In a first non-limiting embodiment, the sub-wavelength structured dielectric element forming the layer 15 has a constant refractive index n1. It is a periodic sub-wavelength structured dielectric element. The dimensions a1, a2 of the patterns 150 remain constant and $\Lambda1$ and $\Lambda2$ are also constant. In other words, the patterns 150 are identically spaced apart from one another in the first direction Ax and are identically spaced apart in the second direction Ay. In other words, the layer 15 has identical spacings $151x$ in the first direction Ax, and identical spacings $151y$ in the second direction Ay (as illustrated in FIG. 4) between the patterns 150, namely there is the same amount of air between the patterns 150.

In a second non-limiting embodiment, the sub-wavelength structured dielectric element forming the layer 15 has a variable refractive index n1. In a first non-limiting alternative embodiment, it is a periodic cell sub-wavelength structured dielectric element. The dimensions a1, a2 of the patterns 150 change along the layer 15 so as to vary the refractive index n1 of the layer whereas $\Lambda1$ and $\Lambda2$ are constant. In a second non-limiting alternative embodiment, it is a non-periodic cell sub-wavelength structured dielectric element. $\Lambda1$ and $\Lambda2$ change along the layer 15 so as to vary the refractive index n1 of the layer 15, whereas the dimensions a1, a2 of the patterns 150 can remain constant. The layer 15 comprises variable spacings $151x$, $151y$ between the patterns 150, namely there are different amounts of air between the patterns 150. Thus, in this second alternative embodiment, it is possible to vary $\Lambda1$ and $\Lambda2$ and also the dimensions a1, a2 of the patterns 150 in order to vary the refractive index of the layer 15. In one non-limiting example, for patterns 150 in the form of segments of tori, the radii of curvature are variable between the patterns 150. In another non-limiting example, for patterns 150 in the form of a truncated pyramid, it is the truncation height that varies.

'Sub-wavelength' is understood to mean that the grating period $\Lambda1$, $\Lambda2$ is less than a quarter of a wavelength $\lambda$ of said range $\Delta1$ of wavelengths $\lambda$. In one non-limiting example, the considered wavelength $\lambda$ is the shortest of the wavelengths in said range $\Delta1$. Thus, $\Lambda1<\lambda/4$ and $\Lambda2<\lambda/4$. In one non-limiting embodiment, the grating period $\Lambda1$, $\Lambda2$ is less than one tenth of said wavelength $\lambda$. Thus, $\Lambda1<\lambda/10$ and $\Lambda2<\lambda/10$. It should be noted that this wavelength $\lambda$ is selected from said range $\Delta1$ and will be the one used in the formulas below.

As illustrated in FIG. 2, when a radar wave R1 is emitted by the radar sensor 10 it travels to the luminous module 13, which has a thickness e0. The radar wave R1 reaches the luminous module 13 with an angle of incidence $\theta$ to which a refracted angle r corresponds. The radar wave R1 is reflected on the luminous module 13 and generates two reflected waves, one R11 of which has been reflected on the outer face of the sub-layer 14 of the luminous module 13 and the other one of which has been reflected inside the luminous module 13. The two reflected waves R11 and R12 are reflected waves, called first order reflected waves, that return to the radar sensor 10. These are parasitic reflections. When the angle of incidence θ differs from 0°, the corresponding refracted angle r also differs from 0°. The phase difference Δφ, also called the phase shift Δφ, between these two reflected waves R11 and R12 is equal to:

$$\Delta\varphi = \frac{n_{eq}\delta}{\lambda} + \pi - \frac{2e0\tan(r)\sin(\theta)}{\lambda} \qquad \text{Math 1}$$

with:

- $n_{eq}$ being the equivalent refractive index for the sub-layer 14 and the layer 15;
- δ being the path of the reflected wave R12 in the material equal to 2e0/cos(r); [SEP]
- nδ/λ being the phase shift due to the path through the material; [SEP]
- π being the phase shift due to the internal reflection in the sub-layer 14 and the layer 15 of patterns 150; [SEP]
- ((2e0 tan(r) sin(0))/λ) being the phase shift in the air due to the difference between the reflection point PO of the reflected wave R11 and the emergence point Pt2 of the reflected wave R12.

As sin(θ)=$n_{eq}$×sin(r), the following is obtained:

$$\frac{-2e0\tan(r)\sin(\theta)}{\lambda} = \frac{-2e0n_{eq}\sin(r)^2}{\lambda\cos(r)} \qquad \text{Math 2}$$

Namely:

$$\Delta\varphi = \pi + \frac{2n_{eq}e0}{\lambda\cos(r)}(1-\sin(r)^2) = \pi + \frac{2n_{eq}e0\cos(r)}{\lambda} \qquad \text{Math 3}$$

and this is the case irrespective of the value of the refracted angle r.

Since the reflected waves R11 and R12 return toward the radar sensor 10, they cause disturbances on the radar sensor 10, namely an attenuation of the signal-to-noise ratio. In order to eliminate these disturbances, the total thickness e0 of the luminous module 13 will be defined so that the reflected waves R11 and R12 are in phase opposition in order to create destructive interference. In order to obtain destructive interference, the phase difference Δφ between the two reflected waves R11 and R12 must be equal to πmodulo 2π. Thus, Δφ=(2m+1)*π, with m being a natural integer. Therefore, the following is obtained:

$$(2m+1)\pi = \pi + \frac{2n_{eq}e0\cos(r)}{\lambda} \qquad \text{Math 4}$$

Namely:

Let $e0=m\lambda/(2n_{eq}\cos(r))$.

It should be noted that the equation $e0=m\lambda/(2n_{eq}\cos(r))$ is applied irrespective of the value of the angle r. Thus, this total thickness e0 is dimensioned so that it is equal to m times said wavelength λ, with the whole being divided by twice an equivalent refractive index $n_{eq}$ of the layer of patterns 150 and of the sub-layer 14, times the cosine of a refracted angle r corresponding to the angle of incidence θ of the radar waves R1, where m is an integer. Thus, based on the equivalent refractive index n eq and on the wavelength λ used over the operating frequency range of the radar sensor 10, the total thickness e0 can be determined so that said reflected waves R11 and R12 cancel each other out. In one non-limiting embodiment, the wavelength λ used is the one located in the middle of the permitted range Δ1.

An ideal total thickness e0 is defined when the angle of incidence θ is equal to 0; and m is equal to 1. When θ=0, r=0. Consequently, for m=1, the ideal total thickness e0 of the luminous module 13 is therefore $e0=\lambda/(2n_{eq})$. When r=0°, then cos (r)=1.

In one non-limiting embodiment, the luminous module 13 has a total thickness e0 that ranges between 0.8 and 1.2 times said ideal total thickness e0. This range of values takes into account the possible emission angles of the radar sensor 10. It should be noted that the values of the angle of incidence θ are included in the possible angles of emission of the radar sensor 10. The possible values of the angle of incidence θ are defined in the technical specifications of the radar sensor 10, which means that the possible values of the angle of incidence θ are in the field of view of the radar sensor 10. In one non-limiting example, the angle of incidence θ ranges between 0° and +/−30°. This range of values from 0.8 to 1.2 allows the manufacturing tolerances of the total thickness e0 to be taken into account.

It should be noted that a value of the angle of incidence θ exists for which the reflected radar waves R11 and R12 cause a maximum disturbance of the receiver antennas 101 of the radar sensor 10. This angle of incidence θ is called the critical angle of incidence θ. In one non-limiting embodiment, this value is equal to θ=arctan (d1/(2e4)), with d1 being the distance between the emitter antenna 100 and the receiver antennas 101, e4 being the distance between the radar sensor and the luminous module 11 as illustrated in FIG. 2. It should be noted that in one non-limiting example, the midpoint of the receiver antennas 101 is taken in order to compute d1.

Thus, depending on the value of the local refractive index n1 and of the wavelength λ used over the operating frequency range of the radar sensor 10 (between 76 GHz to 81 GHz in the non-limiting example used), it is possible to determine the value of the total thickness e0, so that the first order reflected waves R11 and R12 cancel each other out. The reflected radar waves R11 and R12 are reflected on the luminous module 13 in a limited zone.

It should be noted that when the luminous module 13 has a variable equivalent refractive index $n_{eq}$, in one non-limiting embodiment, the thickness e0 is locally adjusted on the zone of the luminous module 13 where the variable equivalent refractive index $n_{eq}$ is found. In this case, the thickness e0 is variable along the surface of the luminous module 13. By contrast, when the luminous module 13 has a constant equivalent refractive index $n_{eq}$, in this case, the thickness e0 is adjusted for the entire surface of the luminous module 13. Consequently, the thickness e0 is constant along the surface of the luminous module 13.

The luminous module 13 has a total thickness e0 formed by the height h1 of the patterns 150 and by the thickness e2 of the sub-layer 14. In order to dimension the total thickness e0, the thickness e2 of the sub-layer 14 is adjusted so that $e0=m\lambda/(2n_{eq}\cos(r))$ for a given r. In this way, the patterns 150 imposed by the optical design are not modified. In one non-limiting embodiment, the given r corresponds to the critical angle of incidence θ.

Thus, the receiver antennas 101 experience less noise. A better signal-to-noise ratio is achieved.

The equivalent refractive index n eq is equal to:

$$n_{eq} = \frac{n_1 n_2 (e_1 + e_2)}{n_2 e_1 + n_1 e_2} = \frac{n_1 n_2 \left(1 + \dfrac{e_2}{e_1}\right)}{n_2 + n_1 \left(\dfrac{e_2}{e_1}\right)} \qquad \text{Math 5}$$

With n1 being the local refractive index of the layer 15 of patterns 150, n2 being the refractive index of the sub-layer 14, e1 being the height h1 of the patterns 150, and e2 being the thickness of the sub-layer 14. When the luminous module 13 is a gradient-index luminous module, it should be noted that n1 is dependent on the position of the local zone Z1 of the patterns 150 on the layer 15 for which the computation is performed. Thus, the equivalent refractive index $n_{eq}$ is dependent on the position of the local zone Z1 on the layer 15. When the luminous module 13 is not a gradient-index luminous module, the computation can be performed at any point of the layer of patterns 150, namely in any zone Z1.

It should be noted that the layer 15 of patterns 150 has a local refractive index n1 that is computed depending on the local density $\tau_r$ of said patterns 150 in the layer 15. The local density $\tau_r$ at a point of the luminous module 13 is the weighted average of the fill factor $\tau_{r152}$ of each cell 152 located at a distance from the considered point that is smaller than a given value of the order of one of the wavelengths $\lambda$ from the range $\Delta 1$ of wavelengths used. The local refractive index n1 is also called the effective refractive index $n_{eff}$ and is made up of two effective refractive indices $n_{effTE}$ and $n_{effTM}$ that depend on the polarization of the incident wave, namely the primary radar wave R1, and which can be expressed as a function of the local density $\tau_r$, also called the fill factor $\tau_r$, which represents the amount of material occupied by the medium with a high refractive index n1, namely in this case the patterns 150, as opposed to the medium with a low refractive index n0, namely air in this case. It should be noted that the local density $\tau_r$ represents the amount of material occupied by the medium with a high refractive index n1 in a zone with a dimension of the order of one of the wavelengths $\lambda$ from the range $\Delta 1$ of wavelengths used. This gives:

$$n_{effTE} = \sqrt{\varepsilon_{effT}} = \sqrt{\tau_r \varepsilon_{max} + (1 - \tau_r)\varepsilon_{min}} \qquad \text{Math 6}$$

$$n_{effTM} = \sqrt{\varepsilon_{effTM}} = \frac{1}{\sqrt{\dfrac{\tau_r}{\varepsilon_{max}} + \dfrac{1 - \tau_r}{\varepsilon_{min}}}} \qquad \text{Math 7}$$

With the term TE designating the polarization of the incident wave, namely in this case the radar wave R1 that reaches the luminous module 13, perpendicular to the plane of the substrate, namely the sub-layer 14, TM designating the polarization parallel to the plane of the substrate, $\varepsilon_{max}$ designating the permittivity of the medium with the highest refractive index, namely the patterns 150, and $\varepsilon_{min}$ designating the permittivity of the medium with the lowest refractive index, namely air in this case. In another non-limiting embodiment, air can be replaced by a plastic with a very low index.

It should be noted that, when the incident wave, in this case the radar wave R1, illuminates the structured dielectric element, namely the layer 15, and has a wavelength $\lambda$ (in said range $\Delta 1$) much larger than the repetition period $\Lambda 1$, $\Lambda 2$ of the structures 150 ($\lambda \gg \Lambda 1$, and $\lambda \gg \Lambda 2$), then this involves a propagation regime called the static limit.

For two-dimensional structures 150 such as those illustrated in FIG. 4, the effective refractive index $n_{eff2D}$ of a 2D structure can be approximated by taking the quadratic mean of the effective refractive indices of the two polarizations TM and TE in one dimension of the order of 0, which corresponds to the static limit. The fill factor $\tau_{r152}$ of an individual cell 152 in this particular case is:

$$\tau_{r152} = \frac{a1 \cdot a2}{\Lambda 1 \cdot \Lambda 2} \qquad \text{Math 7}$$

and:

$$n\_eff2D = [\tfrac{1}{2}(n\_effTE^2 + n\_effTM^2)]^{\char`\^}(\tfrac{1}{2}) \qquad \text{Math 8}$$

In the more general case, for any shape of patterns 150 with any $\Lambda 1$, $\Lambda 2$, and with an individual cell 152 with a rectangular base, the fill factor $\tau_{r152}$ for an individual cell 152 will be:

$$\tau_{r152} = \frac{V152}{\Lambda 1 \cdot \Lambda 2 \cdot h\max} \qquad \text{Math 9}$$

Which corresponds to a ratio of the volume of material ($V_{152}$) in the individual cell 152 to an empty encapsulating volume ($\Lambda 1 \cdot \Lambda 2 . h\max$), with hmax being the maximum height of the pattern 150 in the individual cell 152 (namely, the highest height in the pattern 150); and $$V_{152} = \int_0^{h\max} \int_{X152}^{X152 + \Lambda 1} \int_{Y152}^{Y152 + \Lambda 2} M(X, Y, Z) dX dY dZ \qquad \text{Math 10}$$

With ($X_{152}$, $Y_{152}$, 0) being the coordinates of a corner C1 of the individual cell 152 and M(X, Y, Z)=1 if the point of coordinates (X, Y, Z) is located in material and M(X, Y, Z)=0 if not, namely if the point of coordinates (X, Y, Z) is located in air. It should be noted that, when it is located in the material, the point is located in the pattern 150 of the individual cell 152, and, when it is located in air, the point may or may not be located inside a pattern 150 (since a pattern 150 can actually contain air holes in one non-limiting example). It should be noted that, in the non-limiting example of FIG. 4, hmax=h1 described above.

It should be noted that this formula for the volume of material $V_{152}$ is valid for any individual cell 152 with a rectangular base, irrespective of the shape of the pattern 150 in said individual cell 152. Thus, as $\Lambda 1$ and $\Lambda 2$ can change from one individual cell 152 to another individual cell 152, and as the maximum height hmax can change from one pattern 150 to another pattern 150, each individual cell 152 can contain a different amount of material and therefore have a different fill factor $\tau_{r152}$. In order to obtain the fill factor $\tau_r$ of the entire layer 15 of patterns 150 at a given point of the luminous module 13, a weighted average is computed of the fill factors $\tau_{r152}$ of each cell 152 located at a distance from the considered point on the luminous module 13 that is smaller than a given value of the order of one of the wavelengths of the range $\Delta 1$ of wavelengths used. This definition is valid for all the points of the luminous module 13. In one non-limiting embodiment, the points belong to the surface of the sub-layer 14 of coordinate Z=0. This gives:

$$\tau_r = \frac{\sum_n \Lambda 1_n \cdot \Lambda 2_n \cdot h\max_n \cdot \tau_{rn}}{\sum_n \Lambda 1_n \cdot \Lambda 2_n \cdot h\max_n} \qquad \text{Math 11}$$

Where n designates any one of the individual cells 152 located at a distance from the considered point on the luminous module 13 that is smaller than a given value of the order of one of the wavelengths $\lambda$ of the range $\Delta 1$ of wavelengths used.

Figure 5:
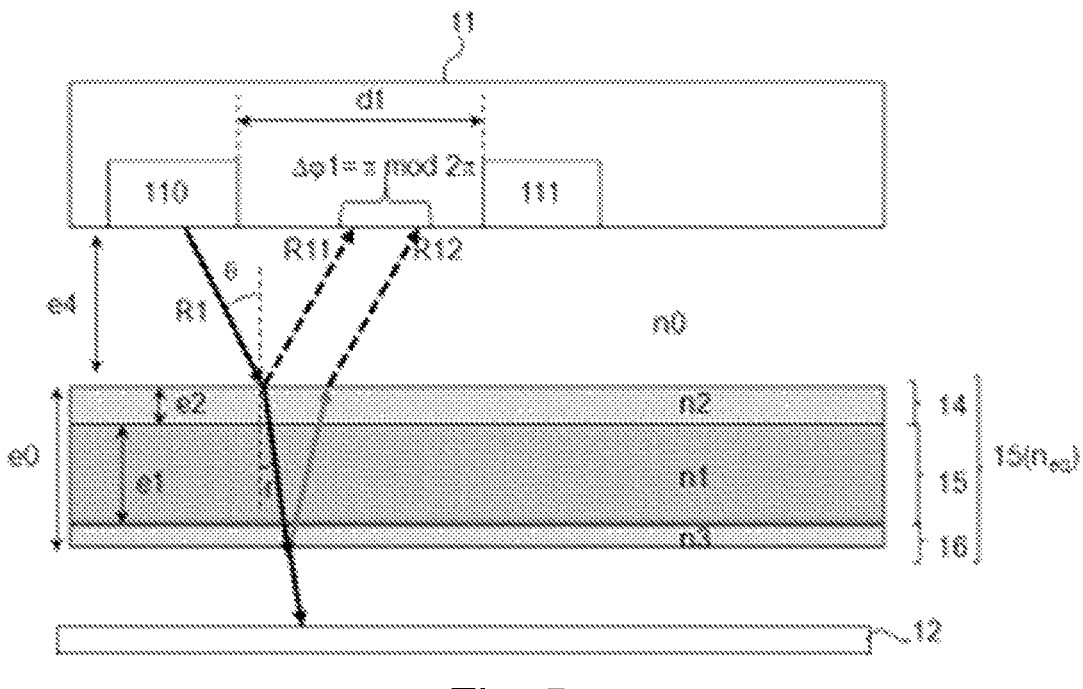
FIG. 5 is a schematic view of a radar wave emitted by the radar sensor of FIG. 1 that is reflected on said luminous module of FIG. 1, with said luminous module comprising an additional layer that is a reflective layer, according to one non-limiting embodiment.

In one non-limiting embodiment illustrated in FIG. 5, the luminous module 13 further comprises a reflective layer 16 in the field of visible and transparent or weakly absorbing light for the radar sensor 10 with a refractive index n3 for the radar waves. In this case, the total thickness e0 of said luminous module 13 is equal to m times a wavelength $\lambda$ of said range, with the whole being divided by twice the equivalent refractive index $n_{eq}$ of said sub-layer 14, of said layer 15 of patterns 150 and of said reflective layer 16, times the cosine of a refracted angle r corresponding to an angle of incidence $\theta$ of the radar waves R1, where m is an integer. Thus, the total thickness e0 of said luminous module 13 is equal to said wavelength $\lambda$ divided by twice the equivalent refractive index $n_{eq}$ of said sub-layer 14, of said layer 15 of patterns 150 and of said reflective layer 16 for an angle of incidence $\theta$ equal to zero. In the computation of the equivalent refractive index $n_{eq}$, this reflective layer 16 is thus taken into account. The previous computations thus must also take into account the refractive index n3. The reflective layer 16 covers the layer 15 of patterns 150. In non-limiting examples, the reflective layer 16 is a layer of indium or of reflective paint that covers the patterns 150.

Of course, the description of the invention is not limited to the embodiments described above and to the field described above. Thus, in another non-limiting embodiment, the radar sensor comprises more than one emitter antenna 100 and more than two receiver antennas 101. Thus, in one non-limiting embodiment, the luminous module 13 can comprise more than three layers. Thus, the computation of the equivalent refractive index n eq will take into account all the layers forming the luminous module 13. Thus, in one non-limiting embodiment, the vehicle assembly 1 further comprises an additional luminous module configured to perform a lighting function comprising a housing. The additional luminous module is thus a lighting luminous module. In non-limiting examples, said additional luminous module is a front headlight, a tail light or a fog light. In this embodiment, the signaling luminous module 13 and the radar sensor 10 are integrated into said housing of the lighting luminous module and the signaling luminous module 13 is disposed next to the lighting luminous module. It should be noted that integrating the radar sensor 10 behind the signaling luminous module 13 instead of the lighting luminous module allows the requirements of manufacturers to be circumvented that tend to limit the space behind the lighting luminous modules. It should be noted that the lighting luminous modules are generally much more bulky longitudinally than the signaling luminous modules. There-fore, there is frequently not enough space to place the radar sensor 10 behind said lighting luminous module.

Thus, the invention described particularly has the follow-ing advantages:

integrating the radar sensor 10 behind the signaling lumi-nous module 13, instead of the bumper, avoids reducing the performance capabilities of the radar sensor 10;

it allows the first order reflected waves R11, R12 to be eliminated that reflect toward the radar sensor 10. The signal-to-noise ratio of said radar sensor 10 is thus no longer low.

What is claimed is:

1. A vehicle assembly for a vehicle, the vehicle assembly comprising:
    a radar sensor configured to emit a number of radar waves over a range of wavelengths;
    a luminous module configured to perform a signalling function where the luminous module includes a sub-layer and a layer of patterns;
    where the layer of the patterns forms a sub-wavelength structured dielectric element,
    a repetition period of the patterns being less than one quarter of one wavelength of the range, where a total thickness of the luminous module is equal to "m" times a wavelength of the range of the wavelengths that radar waves are transmitted;
    the one wavelength being divided by twice an equivalent refractive index of the sub-layer and of the layer of the patterns times a cosine of a refracted angle correspond-ing to an angle of incidence of the number of radar waves, where "m" is a positive integer.

2. The vehicle assembly of claim 1, wherein the radar sensor is a millimeter wave or a hyperfrequency wave or a microwave radar sensor.

3. The vehicle assembly of claim 1, wherein the radar waves are emitted over a frequency band ranging between 100 MHz and 5 GHz.

4. The vehicle assembly of claim 1, wherein the repetition period of the patterns is less than one tenth of the one wavelength of the radar waves.

5. The vehicle assembly of claim 1, wherein the patterns are cylindrical prisms, or rectangular prisms, or pyramidal prisms, or cubic prisms, or segments of tori.

6. The vehicle assembly of claim 1, wherein a pattern from the patterns has dimensions of less than 0.4 mm.

7. The vehicle assembly of claim 1, wherein the total thickness is formed by a height of the patterns and by a thickness of the sub-layer.

8. The vehicle assembly of claim 7, wherein the total thickness is equal to the one wavelength divided by twice the equivalent refractive index when the angle of incidence is equal to zero.

9. The vehicle assembly of claim 1, wherein the total thickness is defined by an angle of incidence equal to arctan (d1/(2e4)), where e4 represents a distance between the radar sensor and the luminous module and d1 is the distance between an emitter antenna and receiver antennas of the radar sensor.

10. The vehicle assembly of claim 1, wherein the lumi-nous module further comprises a reflective layer and the total thickness of the luminous module is equal to m times a wavelength of the range, the whole being divided by twice the equivalent refractive index of the sub-layer, of the layer of patterns and of the reflective layer, times the cosine of a refracted angle corresponding to an angle of incidence of the radar waves, where m is an integer.

11. The vehicle assembly of claim 1, wherein the equiva-lent refractive index is calculated for an angle of incidence of the radar waves equal to a center of a field of view (FOV) of the radar sensor.

12. The vehicle assembly of claim 1, wherein the lumi-nous module is a daylight luminous module, or an indicator light, or a retro reflector, or a high mounted stop lamp.

13. A luminous module disposed facing a radar sensor configured to emit radar waves over a range of wavelengths, the luminous module being configured to perform a signalling function and comprising:

a sub-layer and a layer of patterns, where the layer of the patterns forms a sub-wavelength structured dielectric element;

a repetition period that is less than one quarter of one wavelength of the range of wavelengths that radar waves are transmitted, and where a total thickness of the luminous module is equal to "m" times the one wavelength, where "m" is a positive integer number;

the one wavelength is divided by twice an equivalent refractive index of the sub-layer and of the layer of the patterns times a cosine of a refracted angle corresponding to an angle of incidence of the radar waves, where "m" represents a positive integer.

\* \* \* \* \*